Feb. 21, 1961 O. A. VASBY 2,972,239
FREEZERS AND DISPENSERS
Filed Nov. 12, 1957
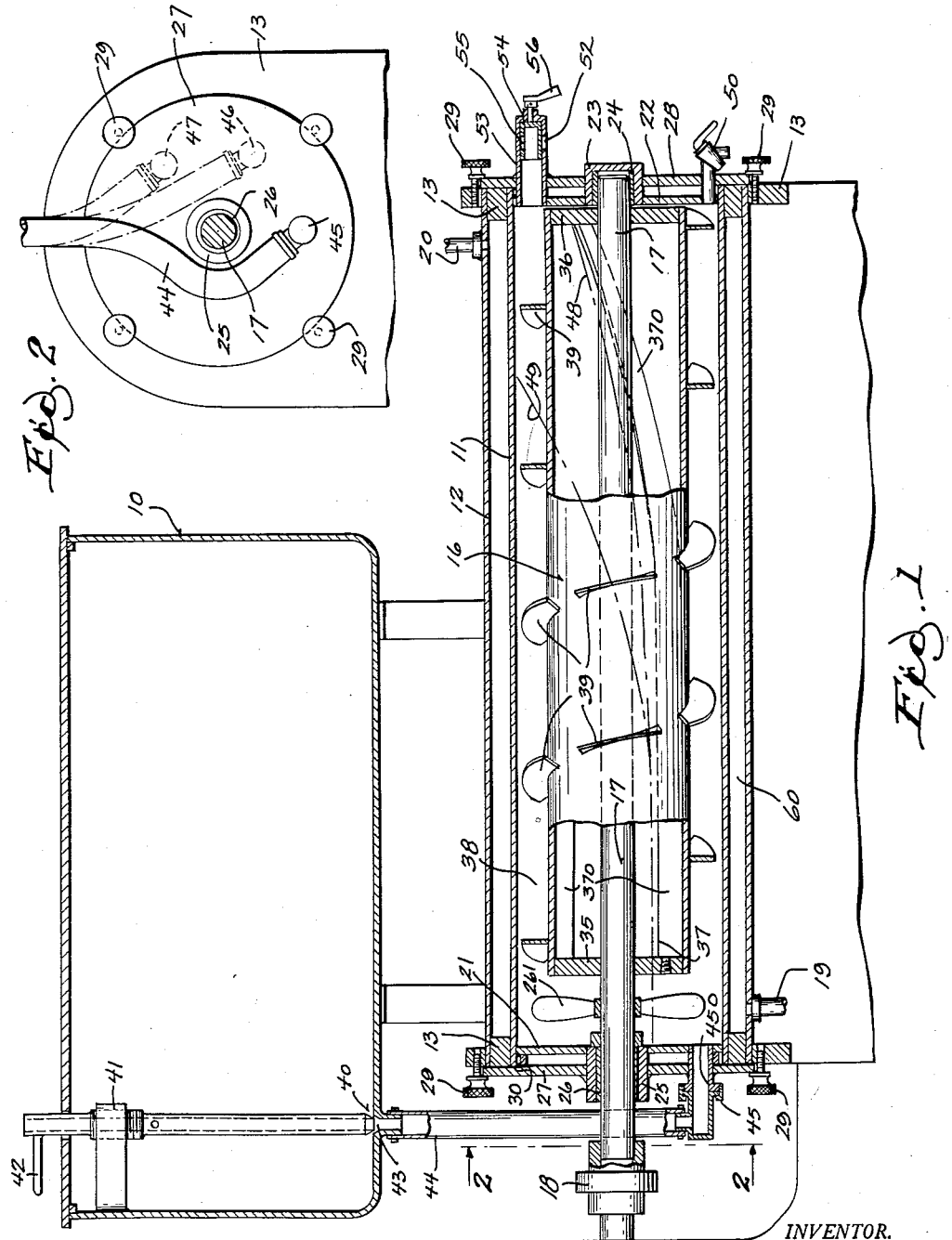
INVENTOR.
OSCAR A. VASBY
BY
Wheeler, Wheeler & Wheeler
ATTORNEYS

United States Patent Office 2,972,239
Patented Feb. 21, 1961

2,972,239

FREEZERS AND DISPENSERS

Oscar A. Vasby, 315 Linden St., Fort Atkinson, Wis.

Filed Nov. 12, 1957, Ser. No. 695,950

8 Claims. (Cl. 62—342)

My invention relates to improvements in freezers and dispensers.

The invention relates to a freezer and dispenser for freezable mixtures. The most popular products for which the machine is used are ice cream or frozen custard mixes, but it will be understood from the following description that other products and mixes may be treated.

While the invention relates to a number of novel improvements in the freezer and dispenser described in my United States patent 2,758,823, issued August 14, 1956, they are substantially related to the general problem of producing a frozen liquid mix having the very best texture and quality produced with least obstruction to the progressive movement of the mix through the mixer and out of the delivery nozzle. Broadly stated, the features of the invention relate to means for maintaining and controlling as to size an air filled zone in the upper part of the freezing cylinder. Also the invention relates to the provision of a displacement type of dasher having substantial length in an elongated cylinder provided with a jacketed exterior wall, the interior of the dasher being supplied with means for keeping the entire dasher from end to end at a uniform temperature to prevent formation of a slug of congealed mix between the dasher and cylinder. Furthermore, the invention relates to the provision of a discharge valve so located as to assure a completely filled outlet end of the working zone between the dasher and jacketed cylinder when the product has reached the proper consistency.

In the drawings:

Fig. 1 is a vertical median section through the principal novel portions of my machine, a central portion of the dasher and its immediately associated parts being shown in side elevation.

Fig. 2 is a section on line 2—2 of Fig. 1.

The principal structural parts of my freezer and dispenser as shown in Fig. 1 include a tank or vat 10 for unfrozen liquid mix to be held in readiness for delivery to the freezer and dispenser located below the vat. There is a jacket 12 about the cylinder and any form of supporting structure at 13 may be used to provide the proper working height of the apparatus.

Within the cylinder 11 is the displacement dasher 16 supported upon its shaft 17. At the end of the shaft 17, shown at the left in Fig. 1, connections are provided at 18 for rotation of the shaft. Connections at 19 for inlet at the bottom and at 20 for outlet of the refrigerant at the top of the cylinder so as to be passed into the space between the cylinder 11 and jacket 12 are shown in Fig. 1. Smaller parts of the machine will be described in detail below.

The working cylinder 11 is of substantial length; for instance, as shown in the drawings, this cylinder is approximately two feet long. It is made of material such as stainless steel and of such quality as to be properly used for food mixes. It has end walls 21 and 22 respectively and end wall 22 is provided with a cup shaped bearing housing 23 for bearing 24 which carries the delivery end of shaft 17. The end 21 of the cylinder is provided with a cylindrical bearing receiver 25 to hold bearing 26 for the other end of shaft 17 at the entry end of the machine. It will be noted that the bearing cup 23 and the cylindrical bearing holder 25 are welded to mounting discs or end plates 27 and 28 respectively which are removably secured to the frame 13 by means of thumb screws 29. Since the end walls 21 and 22 are removable from the cylinder 11 with their respective mounting discs, it will be seen that the displacement dasher 16 and its immediately associated parts may be readily removed from and readily replaced in the cylinder 11, suitable gaskets such as those shown at 30 being provided to keep liquid tight relationship between the end walls and the cylinder when the assembly is complete.

The displacement dasher 16 is hollow and has end walls 35 and 36. This dasher and its associated parts are likewise made of stainless steel or other suitable material for food handling equipment and the end walls are in liquid tight relationship to the cylindrical outer wall of the dasher 16 and to the shaft 17 upon which they are mounted.

Within this dasher a quantity of brine or antifreeze liquid is permanently sealed. The level of this liquid is shown at 37, but it will be understood that larger or smaller quantities at selected level may be used. A few baffles 370 are provided along the interior surface of the dasher to cause the liquid to surge back and forth as the dasher rotates, thus equalizing temperatures throughout the length of this important part of the freezer.

The dimensions of the dasher are such that the end wall 36 is closely adjacent front wall 22 of the cylinder 11 and several inches from the rear wall 21 to provide whipping space where a whipping paddle 261 whips the mix for "injection" of air into newly admitted unfrozen mix. The size of the cylindrical wall 16 of the dasher is such as to leave a relatively restricted elongated annular space 38 between the dasher and the cylinder 11.

It will be understood that scrapers moveable with the dasher to remove congealed product from the interior wall of the cylinder are provided, but I have not shown these in the drawings since they are conventional.

Secured to the outside surface of the dasher 16 are auger flights 39 which comprise "broken" sections of helical, auger-like blades designed to agitate the mix, to whip into the mix a desired amount of air, and, as the mix congeals in its freezing process, to advance the product toward and against the inside of the front wall 22 of the machine.

The tank 10 is a reservoir for mix ingredients to be fed into the annular space 38. A valve 40 is threadedly, adjustably rotatable in a bracket 41 secured to the tank wall, and the valve has a handle 42 to be used to rotate the valve and thus raise and lower it to determine the rate of feed of mix through an outlet port 43. The valve 40 is tubular and has an unobstructed passage from its upper end to its lower end and because the valve 40 is regularly adjusted to permit a relatively small trickle of liquid mix out of the tank 10, there is an entrained amount of air passing downwardly through the outlet port 43.

A delivery tube 44 extending downwardly from the outlet port 43 is made of pliable material and fitted at 45 with a coupling to provide easy attachment to a complementary coupling member at 450 for feed of mix at a selected level respecting the annular treatment space 38. It will be understood that the entire assembly comprising the end wall 21 and disc 27 can be adjustably rotated when the thumb screws 29 are loosened and that, illustratively, the position of the fitting 45 may be adjusted to higher levels such as those shown at 46 or 47 in dotted lines.

Reference has been made above to the fact that connections are provided at 19 and 20 to feed refrigerant liquid or gas into the machine, such refrigerant passes through one of these fittings and out through the other so that an adequate feed of refrigerant reaches an annular space 60 between jacket wall 12 and the outside of cylinder wall 11. In the treatment of most of the materials for which this machine is adapted, the refrigeration is adequate to cause actual congealing of the mix in the annular space 38. Before the mix is cooled sufficiently to congeal, it is agitated at the inlet end of the machine, and as it commences to congeal, it is forced toward the outlet end (to the right as shown in Fig. 1). Because of the advance of the congealed material to the outlet end of the machine shown in Fig. 1, the accumulation of frozen or partially frozen mix completely fills this outlet end of the annular space 38, and this mass builds up to the curved dotted line 48, and finally to the dotted line 49. While a spigot at 50 is provided at the lowest point in the space 38 at the outlet end to drain out any liquid used for washing out the machine, the actual delivery spout for treated material is located at 52 and includes a pipe 53 equipped with a tubular plug 54 shaped as shown clearly in Fig. 1 and provided with an outlet plug port 55. A handle 56 for the plug 54 is used to rotate the plug from closed position as shown in Fig. 1 to open position in which the plug port 55 is aligned with delivery spout 52.

Whenever there is need for feed of mix from the tank 10 to replace frozen product delivered from the delivery spout 52, valve 40 is only opened to provide a trickle of mix to be passed through tube 44. Consequently, air is pulled into the cylinder, or if there is an air opening above the level of liquid at 45, some air may actually be expelled through 44. In any event, when the liquid level in the treatment cylinder rises above the fitting at 45, the air in the cylinder will no longer escape. Thus the level set by a particular rotative adjustment of plate 27 determines the size of the air zone in the cylinder. This means that more or less surface of treated mix is exposed to air according to the selected adjustment. If the curve of accumulated congealed product is along line 48, the product will not yet be up to the delivery level at 52 due to insufficient freezing, but when the machine is congealing sufficient product to build up to the curve 49, there will be presure toward the spout 52 for delivery under the influence of the flights 39.

In describing the operation of the machine, a mix such as an ice cream mix will be considered as the material to be treated. The tank 10 is provided with a supply of this mix. Refrigerant, supplied by a compressor, circulates in space 60 outside of cylinder 11 and inside of jacket 12. Temperature is controlled by conventional temperature controls. Valve 56 is, of course, closed and plug 54 is rotated to the position shown in Fig. 1 so that the port 55 is not aligned with delivery spout 52. Shaft 17 is connected with the proper power sources to rotate this shaft and dasher 16.

Valve 40 is now opened by swinging the handle 42 to threadedly lift the valve. The mix out of the tank 10 is then passed in a trickle through the tubular valve into the delivery tube 44 and the mix and air is thus delivered into the space 38. Initially, of course, the mix is fluid and the rotating dasher agitates the mix while the heat is being extracted from it. I have found 60 r.p.m. of this dasher to be quite satisfactory although I have used as low as 40 r.p.m. and secured an acceptable product. This contrasts with the current instruction books respective to prior art machines recommending 250 to 300 r.p.m. to obtain proper air incorporation. As the mix commences to congeal on the cold surfaces of the inner side of the walls of cylinder 11, the auger-flights 39 bring it toward the delivery end of the machine and progressively the more solid portions of the mix begin to pile up at the right-hand end of the machine as shown in dotted lines at 48. Later, of course, the pile-up is more marked, but since the cylinder 11 is closed and the depth of mix in the space 38 rises to the opening at 45, which has been selected for connection of pipe 44 with the cylinder, a predetermined amount of air is trapped above the mix in the cylinder. The amount of air trapped above the mix in the cylinder determines the area of mix which is directly exposed to air during the mixing and refrigeration and this determines the texture of the completely treated product. Empirically the operator of the machine determines the best texture for his purposes and can "prescribe" the amount of air to be beaten into his product. This, by the way, is not a matter of dilution or diminishing of the value of the completed product. It is a matter of skillful determination of a satisfactory product considering the uses to which the product is to be put. For instance, a greater amount of air mixed into an ice cream mix is very much to be preferred if the product is to be stored under deep refrigeration, whereas a lesser amount of air may be desired if the product is to be sold and consumed immediately upon delivery from spout 52.

Hereinafter I shall refer to the particular level determined by a particular position of the opening at 45 as being the static level of liquid material in the cylinder.

When a quantity of congealed mix has piled up at the delivery end of the machine, approximately along the line 49 as shown in Fig. 1, it will be noted that the congealed mix has substantially blocked the outlet end of the machine so as to prevent a loss of air from the cylinder 11 through outlet spout 57 at the time when that spout may be open. Under these conditions the continued rotation of the dasher will continue to mix and work both the liquid and the partially congealed mix. Under these conditions the advancing action of the auger-flights to move the product toward the delivery end will continue.

The decrease in temperature in treatment zone 38 may tend to build up a collar or annular blockage of quite solidly frozen treated material at a midpoint in the length of the machine, as it is much easier to insulate the midsection of the cylinder than to insulate the removable ends, which must be removable for cleaning. Thus when the operator tends to keep cream at spout 52 at a customary 18 to 19 degrees serving temperature, cream midway in cylinder 11 tends to cling to dasher 16 as it is colder than 18 degrees, thus forming such blockage that when spout 52 is open nothing would emerge. However, the antifreeze solution inside dasher 16, with auger-flights 370 also inside dasher 16 (such auger-flight mounted so as to keep the enclosed antifreeze solution splashing and surging against front end wall 36) keeps the temperature uniform from front to rear, so a firm serving is always available, and the frozen blockage is eliminated. The antifreeze solution is initially cooled by the mix first being in contact with the refrigeration cylinder, then in contact with the displacement dasher, the mix serving as the intermediary. As cream is still servable at 21 degrees, the solution may warm up to 21 degrees during rush periods, but will be cooled again to 18 degrees during the slower business hours.

The large displacement dasher and therefore the larger amount of antifreeze which may be used in accord with the above disclosure makes it possible to adjust the amount of antifreeze to the type of customer service regularly encountered. Thus an expected large surge in trade may be accommodated by having a large quantity of antifreeze in the dasher which will be drawn upon as a heat absorbing "mass" when fast delivery of product is desired for short durations.

I claim:

1. In a freezer and dispenser for congealable liquid material, a horizontal elongated refrigerated cylinder having an inlet end with inlet port means selectively positionable at desired heights above the bottom of said end, a delivery end of said cylinder opposite said inlet end and having a delivery opening at the top of said end, a displacement dasher comprising a rotatably mounted closed cylinder within said refrigerated cylinder providing an annular space for material to be treated between said dasher and the refrigerated cylinder, said dasher being provided interiorly with a quantity of antifreeze liquid, means connected with the dasher for advancing congealed material toward said outlet end whereby said congealed material is accumulated sufficiently to be dispensed through said outlet.

2. In a device of the character described, a refrigerated treatment chamber having an inlet and an outlet, said inlet being positioned at a lower portion of the chamber and provided with means for feeding liquid material to be treated and air at ambient air pressure into said chamber, said outlet being positioned immediately adjacent the top of said chamber and provided with a closure member for release of congealed treated material whereby to trap air in the upper portion of the chamber, a dasher mounted for movement in the chamber and shaped to advance congealed refrigerated material toward the outlet whereby to build up a mass of congealed material for dispensing at the outlet and to prevent escape of trapped air from the chamber.

3. In a device of the character described a cylindrical refrigerated treatment chamber having an inlet end and an outlet end to close said chamber, said chamber being provided at its inlet end with means for feeding liquid material to be treated and air into said chamber below the axis of the chamber, a dasher mounted for movement in the chamber and shaped to advance congealed refrigerated material toward the outlet end, and outlet means for delivery of congealed refrigerated material at the delivery end positioned above said axis.

4. In a device of the character described a cylindrical refrigerated treatment chamber having an inlet end and an outlet end to close said chamber, said chamber being provided at its inlet end with means for feed liquid material to be treated and air at ambient air pressure into said chamber below the axis of the chamber, a dasher mounted for movement in the chamber and shaped to advance congealed refrigerated material toward the outlet end, and outlet means for delivery of congealed refrigerated material at the delivery end positioned above said axis.

5. A freezer and dispenser having a horizontal elongated freezer cylinder exteriorly jacketed along its cylindrical walls and having end walls secured in liquid tight relation to the cylinder, a hollow sealed cylindrical dasher mounted for rotation in said freezer cylinder and having a diameter to provide an annular treatment zone between the dasher and the cylinder, auger flight baffles secured to the dasher in position to advance treated material along the said annular zone toward a delivery end of the freezer cylinder, an adjustable inlet connection through the end wall opposite said delivery end, said opposite end being releasably secured to the freezer cylinder and selectively adjustable to different positions in secured relationship to said freezer cylinder for attachment to the inlet connection as adjusted, a valved spout for the delivery of congealed material from the treatment zone positioned at a high point above the axis of the freezer cylinder adjacent the delivery end thereof, and a reservoir and valved connection to said adjustable inlet connection for feed of congealable material and air to said freezer cylinder.

6. A freezer and dispenser having a horizontal elongated freezer cylinder exteriorly jacketed along its cylindrical walls and having end walls secured in liquid tight relation to the cylinder, a hollow cylindrical dasher mounted for rotation in said freezer cylinder and having a diameter to provide an annular treatment zone between the dasher and the cylinder, auger flight baffles secured to the dasher in position to advance treated material along the said annular zone toward a delivery end of the cylinder, an inlet connection through one end wall adjustably positionable for feed of liquid material and air to the cylinder whereby to determine the static level of liquid in the freezer cylinder, a valved outlet spout for the delivery of congealed material from the treatment zone positioned at a high point above said static level adjacent the other end wall, a reservoir for untreated liquid material above the cylinder and having an air tube extended downwardly into connection with said inlet connection for feed of air to the treatment zone, and a trickle valve connection between the reservoir and said air tube whereby liquid may be fed with air to the treatment zone, the hollow dasher being provided with a quantity of liquid antifreeze and baffles to cause the antifreeze to surge within the dasher.

7. A freezer and dispenser having a horizontal elongated freezer cylinder exteriorly jacketed along its cylindrical walls and having end walls secured in liquid tight relation to the cylinder, a hollow cylindrical dasher mounted for rotation in said freezer cylinder and having a diameter to provide an annular treatment zone between the dasher and the cylinder, auger flight baffles secured to the dasher in position to advance treated material along the said annular zone toward a delivery end of the cylinder, an inlet connection through one end wall adjustably positionable for feed of liquid material and air to the cylinder whereby to determine the static level of liquid in the freezer cylinder, a valved outlet spout for the delivery of congealed material from the treatment zone positioned at a high point above said static level adjacent the other end wall, a reservoir for untreated liquid material above the cylinder and having an air tube extended downwardly into connection with said inlet connection for feed of air to the treatment zone, and a trickle valve connection between the reservoir and said air tube whereby liquid may be fed with air to the treatment zone, the hollow dasher being provided with a quantity of liquid antifreeze and baffles to cause the antifreeze to surge within the dasher, said end walls being without refrigeration.

8. In a device of the character described, an externally refrigerated treatment chamber having an elongated configuration and having a sealed hollow revoluble dasher therein and conforming to said configuration but spaced therefrom to provide space for turning it and having a quantity of antifreeze fluid therein whereby temperature of the dasher lowered by heat transfer through the material being treated is equalized throughout the length thereof, said hollow interior of the dasher having baffles shaped to agitate the antifreeze fluid.

References Cited in the file of this patent

UNITED STATES PATENTS

| | | |
|---|---|---|
| 2,131,511 | Gray | Sept. 27, 1938 |
| 2,266,032 | Harrington | Dec. 16, 1941 |
| 2,281,944 | Miller | May 5, 1942 |
| 2,302,169 | Baker | Nov. 17, 1942 |
| 2,535,462 | Stoelting | Dec. 26, 1950 |
| 2,689,113 | Merrill | Sept. 14, 1954 |
| 2,698,163 | Swenson | Dec. 28, 1954 |
| 2,737,024 | Swenson | Mar. 6, 1956 |
| 2,758,823 | Vasby | Aug. 14, 1956 |
| 2,760,344 | Oltz | Aug. 28, 1956 |